Aug. 26, 1958

O. J. BORNGESSER 2,849,198

HYDRAULIC FORCE-LIMITER FOR AIRCRAFT CONTROLS

Filed Jan. 24, 1956

INVENTOR.
OTTO J. BORNGESSER

BY
*ATTORNEYS*

INVENTOR.
OTTO J. BORNGESSER

INVENTOR.
OTTO J. BORNGESSER

United States Patent Office 2,849,198
Patented Aug. 26, 1958

2,849,198

HYDRAULIC FORCE-LIMITER FOR AIRCRAFT CONTROLS

Otto J. Borngesser, Hermosa Beach, Calif., assignor, by mesne assignments, to the United States of America as represented by the Secretary of the Navy Application January 24, 1956, Serial No. 561,168

10 Claims. (Cl. 244—83)

This invention relates to aircraft controls, and more particularly to an improved hydraulic control for limiting the force that can be applied by a pilot to aircraft control surfaces to overstress the aircraft, and which will permit the pilot to intentionally override the limiting force in emergency operation.

To obtain the increased performance requirements of present day military aircraft, it has been found necessary to reduce aircraft dynamic stability to such an extent that pronounced over-shoot may occur during abrupt maneuvers over part of the designed performance range of the airplane. This trend has resulted in the disadvantage of placing the imminent destruction of the aircraft due to aerodynamic overloads within reach of the pilot as an everyday danger and of which he may not be immediately aware. This danger has been only partially met by an increase in design-stress requirements, since aircraft weight must be held within prescribed limits. Accordingly, the need has arisen for some means for limiting the gravity forces or "G's" of an aircraft maneuver and preventing damage to the aircraft by air loads beyond the design limits.

A number of devices have been developed to limit the force that can be applied by a pilot to the controls of an aircraft. The early limiters relied on one or more masses statically balanced by springs which directly actuated the control surfaces of the aircraft in a direction to produce a retardation or negative acceleration. Later devices utilized hydraulic systems in conjunction with springs and weights, and depended on the dynamic air pressure or air speed of the aircraft to initiate the application of the limiting force on the aircraft controls. These hydraulic systems were complex in construction, and in most instances had no provision for overriding the limiter where demanded by military necessity. In some prior force-limiters, provisions have been made for emergency operation of the aircraft in an overloaded condition through a separate device actuated by the pilot when the need arises which required an independent operation by the pilot.

According to the present invention a hydraulic force-limiter is incorporated in the manual control linkage of an aircraft, and comprises a valve that ports fluid pressure to a piston connected to the linkage when the aircraft is being subjected to a highly stressed condition. The piston applies a restraining force to the linkage for two purposes, namely, to appraise the pilot of the overstressed aircraft and to greatly increase the force required to operate the controls under such a condition. An important feature of the invention resides in the ability of the pilot to intentionally override the limiting action by applying an abnormally large force on the control linkage to overcome the restraining force. This arrangement takes advantage of the pilot's natural reactions and eliminates the necessity of actuating other devices and of diverting his attention from the task of flying the aircraft in the emergency. In the preferred embodiment, the overriding feature is accomplished by shifting the valve to a position to vent the fluid pressure on the piston. Means are provided for regulating the restraining force exerted by the limiter according to the altitude of the aircraft.

A principal object of this invention is to provide a force-limiter device for aircraft controls which will warn the pilot that the aircraft is dangerously stressed and make it difficult to overstress the aircraft.

A further object of this invention is to provide such a force-limiter for aircraft capable of being intentionally by-passed when the occasion requires such action and in a simple and expedient manner.

Still another object is to enable the force-limiter to be by-passed by actuation of the same aircraft controls as are used in flying the aircraft.

Further objects are to provide a force-limiter which can be readily adjusted; which will be more reliable in operation; and which is simple and inexpensive in construction.

Other objects and many of the attendant advantages of this invention will be readily understood by reference to the following detailed description when considered in connection with the accompanying drawings wherein.

Figure 1:
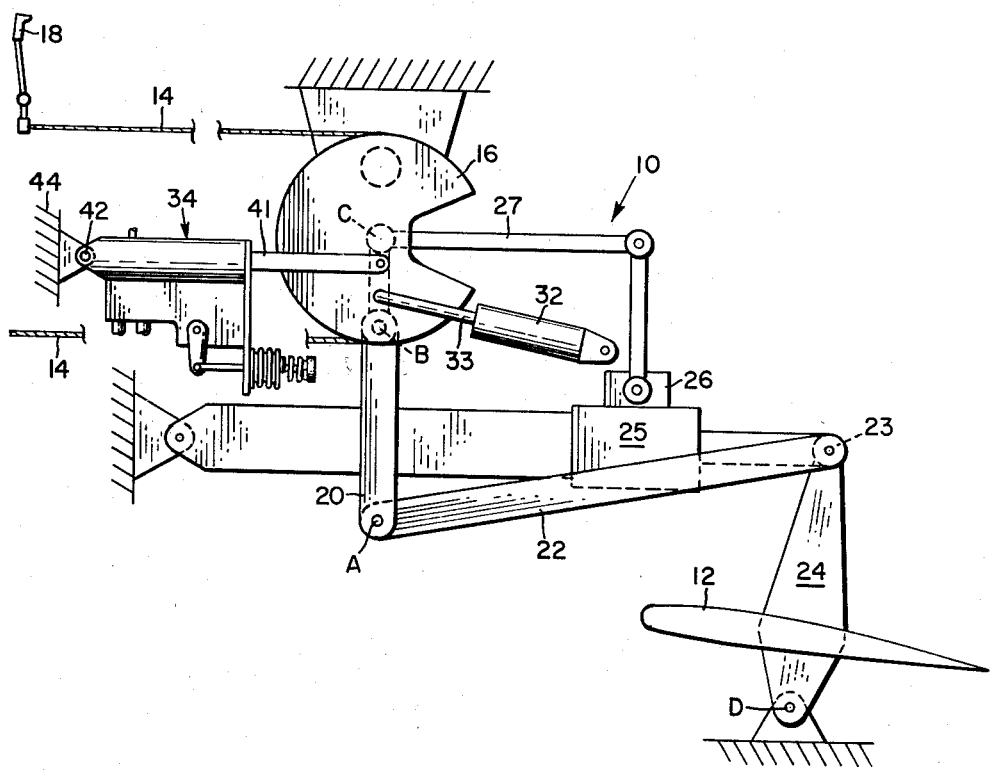
Fig. 1 is a schematic diagram of an aircraft control system embodying the force-limiter of this invention.
Figure 2:
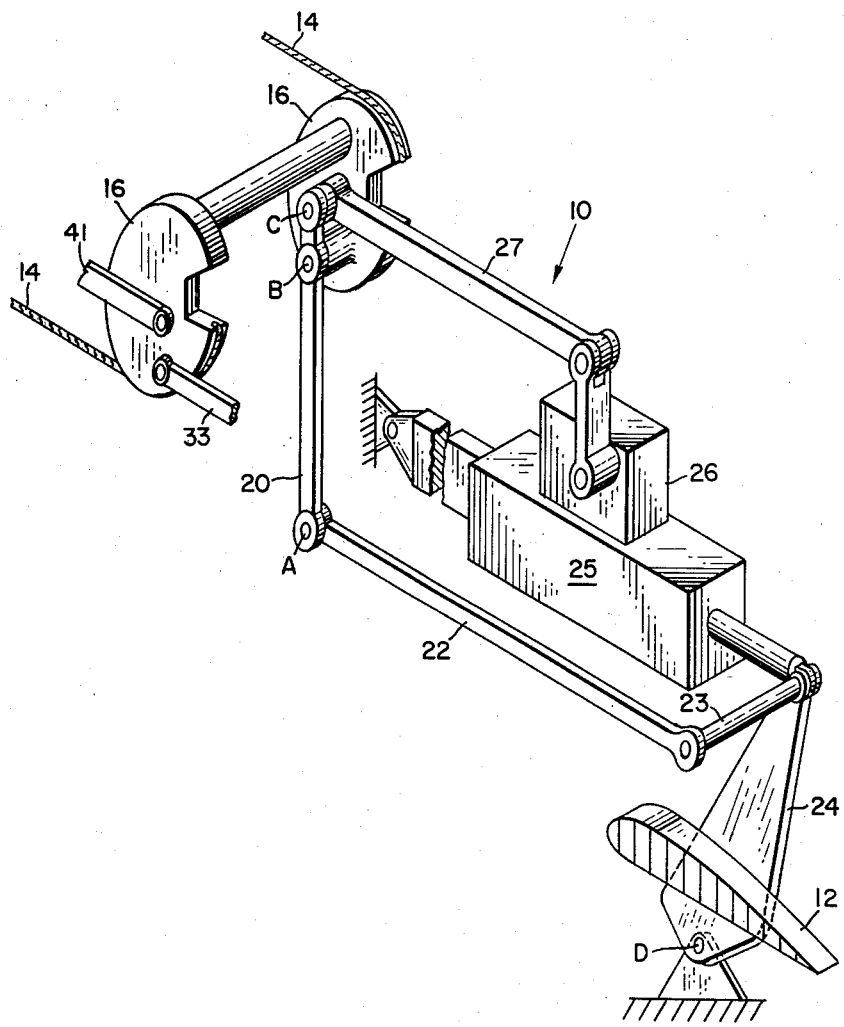
Fig. 2 is a perspective schematic of the control linkage.

Referring now to the drawings wherein like reference characters designate like or corresponding parts throughout the several views, there is shown generally in Figs. 1 and 2 a conventional manual control system 10 for aircraft control surfaces, such as the horizontal stabilizer 12. The control system comprises manually operated linkage having a cable system 14 including a pair of integrally spaced sector pulleys 16 actuated by a pilot's control stick 18. Sectors 16 are connected to horizontal stabilizer 12 through an arm 20 connected to a link 22, at fulcrum A, a crank arm 23, and a stabilizer arm 24, the latter being supported to the aircraft frame at fulcrum D for moving the stabilizer in response to stick movement. An hydraulic actuator 25 is connected to the stabilizer and is controlled by a valve 26 positioned by a link 27 connected at one end to arm 20 at fulcrum C which will coincide with the center rotation of sectors 16 in certain positions. Arm 20 is connected to one of the sectors at fulcrum B being eccentric with respect to the center of rotation of sectors 16. The foregoing arrangement provides a follow-up mechanism. Link 27 may be formed as a simple link, as illustrated, or may include adjustment means for the purpose of varying the effective length thereof, and which may be mechanically or electrically actuated in response to autopilot signals or other pitch correction signal source. A bungee 32 is connected by arm 33 to the other sector 16 at a point offset from the sector axis to provide a predetermined tension on the control linkage and serving as a "feel load" to the pilot when actuating horizontal stabilizer 12.

The foregoing control system is representative of conventional control systems presently in use, and the present invention resides in providing such a system with a force-limiter 34, for applying a relatively high opposing force to the pilot when his input to the control system would otherwise increase the structural loads on the aircraft beyond the yield point.

Figure 3:
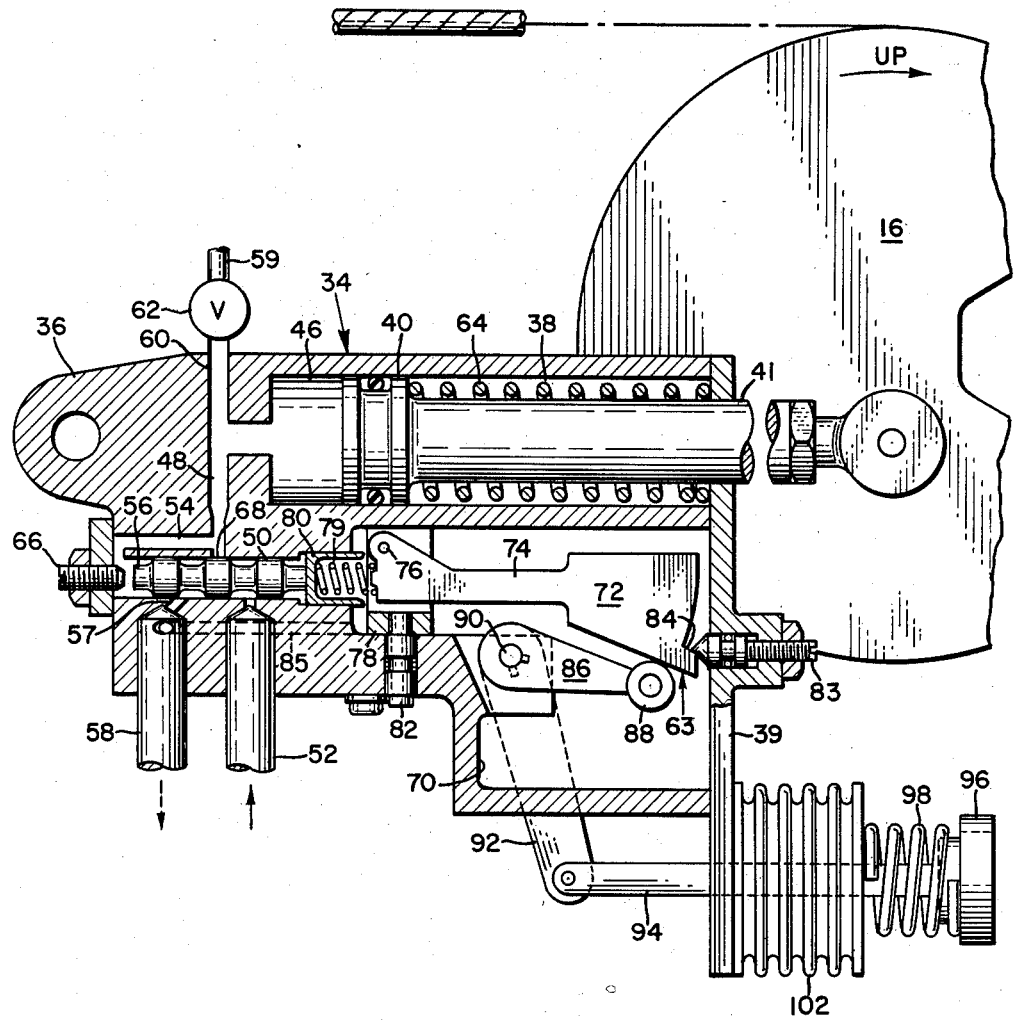
Fig. 3 is an enlarged longitudinal section of the force-limiter of Fig. 1.

Referring to Fig. 3, force-limiter 34 comprises a hydraulic block 36 having formed therein a piston chamber 38 closed by a cover plate 39. A piston 40 and piston rod 41 are reciprocally disposed within chamber 38, the latter projecting through the plate 39 and connected to one of the sectors 16 at a point offset from the axis thereof to provide a suitable torque arm. To permit the reciprocable movement of the piston as it rocks with the sectors, block 36 is pivoted at 42 to a frame 44 of the aircraft (see Fig. 1). Inner end 46 of the piston chamber is connected by a fluid passage 48 through a spool valve 50 to a source of fluid pressure, preferably, hydraulic oil in line 52 from a utility pressure source in the aircraft, not shown. As an example of one design, fluid source may provide a volume of .66 G. P. M. at a pressure of 3000 p. s. i.

Chamber end 46 is vented through a fluid passage 54 leading around a piston end 56 of valve 50, through port 57 to return line 58, chamber end being also vented to return line 59 through a fluid passage 60 and a restrictor 62. Restrictor 62 may be set at pass .36 G. P. M. at 1000 p. s. i., and .036 G. P. M. at 10 p. s. i. Thus it can be seen that spool valve 50 controls the admission and exhaust of oil pressure to piston 40, according to its position in the block which depends on a bobweight mechanism 63 as affected by aircraft maneuvers, presently to be described.

Figure 4:
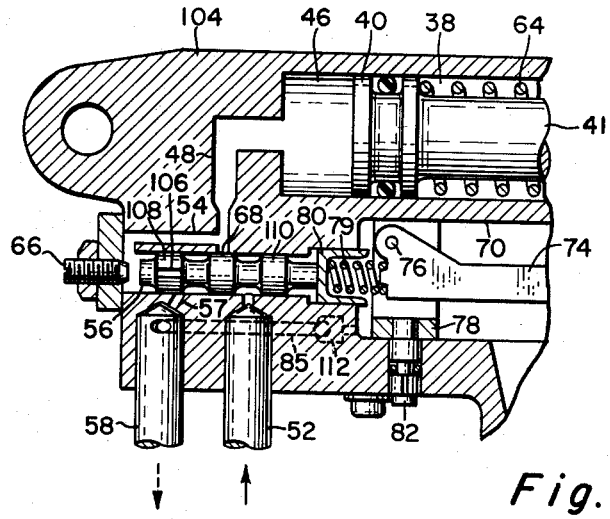
Fig. 4 is a partial longitudinal section of a modified force-limiter.

When the aircraft is beign maneuvered at normal "G," valve 50 is in a neutral position, as shown in Figs. 3 and 4, normally blocking the pressure flow in line 52 to piston 40. It may, however, be desirable to provide a small continuous flow through the hydraulic system to assure that the movable parts are always coated with the hydraulic oil to prevent sticking after periods of inactivity. Accordingly, a small amount of leakage, i. e. 10 p. s. i. may be permitted from line 52 around spool valve 50 by adjustments hereinafter descrbied. The area of valve piston end 56 acted upon by the leakage flow in the passage is so designed as to balance the normal force applied by the bobweight mechanism. To counter balance the fluid pressure in chamber end 46 from the controlled leakage, a compression coil spring 64 is disposed on the back side of piston 40 around the piston rod to apply an equal force, i. e. 10 p. s. i. to oppose the fluid pressure. Thus, at normal "G" conditions no force will be transmitted to sector 16 that might otherwise retard the pilot's operation of the controls.

An adjustable set screw 66, axially aligned with spool valve 50, is adapted to limit valve movement and control the maximum opening of the valve port 68 to passage 48 and, consequently, the maximum pressure to piston 40 and the maximum resistance force to be applied to the control system.

As previously described, valve 50 is moved from the neutral position by bobweight mechanism 63 when the aircraft is subjected to an excessive "G" force. The bobweight mechanism is housed within a compartment 70 formed in block 36, and comprises a bobweight 72 having an integral arm 74 pivoted at 76 to a U-shaped slide 78 supported within the block adjacent spool valve 50. Bobweight 72 is resiliently connected to valve 50 through a voil spring 79 seated at one end in a cup-shaped valve end 80, the other end of the spring bearing against a recessed end of bobweight arm 74. As will be later described, this resilient connection through spring 79 enables valve 50 to be moved to a vented position, not withstanding the force exerted by the bobweight, when the pilot acts to override the limiter for emergency operation. Slide 78 is connected to an eccentric adjustment 82 accessible for the exterior of block 36 for moving the position of pivot 76 with respect to the block, which adjustment will change the neutral postion of valve 50 and the leakage flow therethrough. An additional adjustment of the position of valve 50 affecting the leakage flow is afforded by an adjusting screw 83 extending through cover plate 39 and adapted to engage a recessed shoulder 84 in the bobweight to vary its level position. Any leakage of the hydraulic oil into compartment 70 is vented to return line 58 through fluid passage 85.

Bobweight 72 is supported in a neutral position by a crank arm 86 having a roller 88 at the free end on which the bobweight rests, the arm being keyed at the other end to a shaft 90 journalled in the block. A second crank arm 92 is keyed at one end to shaft 90 and is pivoted at the other end to a link 94 which extends freely through cover plate 39 and terminates in a disc member 96 secured thereto, the latter being acted upon by a compression spring 98 disposed between the plate and disc member. Spring 98 is set to resist any pivotal movement of bobweight 72 when the aircraft is subjected to normal "G" force. Since at high altitude a larger "G" force may be applied to the airplane without causing damage, the bobweight mechanism includes a bellows 102 disposed between spring 98 and end plate 39. The bellows, containing air of greater than ambient pressure at high altitudes, will expand with the decreased atmospheric pressure at higher altitudes thus increasing the force exerted by spring 98 and preventing bobweight 72 from moving downwardly as rapidly as at lower altitudes. If desired bellows 102 may be made responsive to other factors, such as dynamic air pressure. Spring 98 may be set up to five "G's" at 25,000 feet elevation, and three "G's" at sea level.

The modified hydraulic block 104 illustrated in Fig. 4 is identical with that of Fig. 3 with the exception that a groove 106 is formed in land 108 of spool valve 110 serving the same function as restrictor 62 of Fig. 3, namely venting the leaking flow in piston chamber 46, and thereby eliminating the need for a separate restrictor. As an additional feature, a oneway check valve 112 is inserted in vent passage 85 from compartment 70 to prevent surges in the hydraulic oil return system from entering the compartment and giving a false "G" indication.

The operation of the force-limiter is described with reference to Figs. 1 and 3. During normal "G" operation of the aircraft, valve 50 is in neutral position, as adjusted by eccentric adjustment 82 or screw 83, admitting a small predetermined leakage flow from supply line 52 to chamber 46 and against piston 40, which leakage is vented from the chamber through lines 58 and 59 (Fig. 3) or line 58 (Fig. 4). Spring 64 applies an equal and opposite pressure to the piston to balance the leakage pressure preventing the transmission of any force by the force-limiter to sector 16 and the pilots control linkage during normal operation.

When the aircraft is subjected to an excessive "G" force, bobweight 72 is displaced from the neutral position or level against the resistance of spring 98, compressing spring 79 which moves spool valve 50 to a position to admit an increased fluid flow to chamber 46. The increased pressure on piston 40 is transmitted to sectors 16 adding resistance to the pilot's stick movement that can be readily sensed since it is more difficult to operate the controls. This resistance will tend to discourage such abnormal stick movement so that the aircraft is restored to safe operation at which time, spring 98 returns bobweight 72 to a neutral position through the associated linkage permitting spool valve 50 to be restored to neutral position under the action of fluid pressure on piston end 56.

However, should it be imperative for tactical reasons that the pilot operate the aircraft in the overstressed condition, the force-limiter can be readily overridden by the application of an abnormally large force on the controls overcoming the resistance of the force-limiter by displacing the fluid in chamber 46 through passage 54 and against valve piston end 56. This pressure on piston end 56 forces spool valve 50 past the neutral position to vent the fluid through port 57 to return line 58 which compresses spring 79 against bobweight 72 still in a displaced position by the excessive maneuver of the aircraft. In this position, spool valve 50 also blocks the fluid pressure in line 52 to piston 40. The force-limiter will be rendered inactive as long as the emergency operation persists and the pilot exerts the necessary additional force on the controls to maintain spool valve in the vented position.

The operation of the modification of Fig. 4 is similar to that of Fig. 3 except that the leakage flow from chamber end 46 is vented to return line 52 via groove 106, and any surges in the return line is prevented from entering compartment 70 by check valve 112.

The force-limiter of this invention applies a resistance force to the aircraft controls that warns the pilot that the aircraft is being overstressed and, simultaneously makes it difficult for the pilot to continue this maneuver unless an intentional and determined effort is made by the pilot at which time the force limiter is by-passed. This overriding action is achieved automatically by the pilot through continued manipulation of his control stick without diverting his attention or removing the hands from the stick. Dependability of the force limiter is enhanced by the provision of a controlled leakage for lubricating the component parts of limiter during standby conditions.

Obviously many modifications and variations of the present invention are possible in the light of the above teachings. It is therefore to be understood that within the scope of the appended claims the invention may be practiced otherwise than as specifically described.

I claim:

1. In an aircraft having a control surface moved in accordance with a manual force applied by a pilot to control linkage, a hydraulic force-limiter comprising a cylinder, a piston reciprocable in the cylinder and connected to the control linkage, a source of fluid pressure, a valve for porting fluid pressure to one side of the piston for applying a resistance force on said control linkage warning the pilot that the aircraft is being overstressed, a movable mass connected to said valve for actuating said valve to the porting position when the aircraft is subjected to an excessive gravity force, and means operable by the movement of the control linkage for venting the fluid pressure on the piston and overriding the limiter for emergency operation of the aircraft.

2. The force-limiter of claim 1 wherein said connection between the mass and the valve is resilient.

3. In an aircraft having a control surface moved in accordance with a manual force applied by a pilot to control linkage, a hydraulic force-limiter comprising a cylinder, a piston reciprocable in the cylinder and connected at one end to the control linkage, a source of fluid pressure, a valve for porting fluid pressure to one side of the piston for applying a resistance force on said control linkage as a warning to the pilot that the aircraft is being overstressed, a movable mass for actuating said valve to the porting position when the aircraft is subjected to an excessive gravity force, and means for applying a force through the control linkage for moving said valve to a position to vent the fluid pressure on the piston for overriding the limiter for emergency operation.

4. In an aircraft having a control surface moved in accordance with a manual force applied to control linkage, a hydraulic force-limiter comprising a cylinder, a piston reciprocable in the cylinder and connected at one end to the control linkage, a source of fluid pressure, a valve for porting fluid pressure to one side of the piston for applying a resistance force on said control linkage as a warning to the operator when the aircraft is being overstressed, a movable mass for actuating said valve when the aircraft is subjected to an excessive gravity force, a resilient means connecting the mass to one end of said valve, a fluid passage connecting said one side of the piston to the opposite end of said valve whereby said valve may be hydraulically moved by an additional force exerted by the pilot on the linkage to vent the fluid pressure on the piston and override the limiter for emergency operation of the aircraft.

5. In an aircraft having a control surface moved in accordance with a manual force applied by a pilot to control linkage, a hydraulic force-limiter comprising a cylinder, a piston reciprocable in the cylinder and connected to the control linkage, a source of fluid pressure, a valve for porting fluid pressure to one side of the piston for applying a resistance force on said control linkage as a warning to the operator that the aircraft is being overstressed, a movable mass connected to said valve for actuating said valve to the porting position when the aircraft is subjected to an excessive gravity force, a spring for urging said mass to a neutral position, means responsive to the altitude of the aircraft to vary the force of said spring, and means controlled by the linkage for overriding the limiter for emergency operation of the aircraft.

6. In an aircraft having a control surface moved in accordance with a manual force applied by a pilot to control linkage, a hydraulic force-limiter comprising a cylinder, a piston reciprocable in the cylinder and connected at one end to the control linkage, a source of fluid pressure, a valve for porting fluid pressure to one side of the piston for applying a resistance force on said control linkage as a warning to the operator that the aircraft is being overstressed, a movable mass connected to said valve for actuating said valve when the aircraft is subjected to an excessive gravity force, means for adjusting the neutral position of said valve to permit a controlled leakage flow of the fluid to the piston, a spring on said one end of the piston for balancing the force on the piston from the pressure of said leakage flow, means for exhausting said leakage flow, and means for overriding the limiter for emergency operation of the aircraft.

7. The device of claim 6 wherein the adjusting means consists of a screw for limiting the movement of the mass.

8. The device of claim 6 wherein the mass is pivotally supported and the pivotal support is movable for adjusting the neutral position of the valve.

9. In an aircraft having a control surface moved in accordance with a manual force applied by a pilot to control linkage, a hydraulic force-limiter comprising a cylinder, a piston reciprocable in the cylinder and connected at one end to the control linkage, a source of fluid pressure, a valve for porting fluid pressure to one side of the piston for applying a resistance force on said control linkage as a warning to the operator that the aircraft is being overstressed, a movable mass resiliently connected to one end of said valve for actuating said valve when the aircraft is subjected to an excessive gravity force, a spring for resisting the movement of the mass, means responsive to the altitude of the aircraft to vary the force of the spring, a fluid passage connecting said one side of the piston to the opposite end of the valve whereby said valve may be hydraulically moved against the action of the mass by an additional force exerted by the pilot on the linkage to vent the fluid pressure on the piston and override the limiter for emergency operation of the aircraft, and means for fluid pressure on the piston for overriding a limiter during emergency conditions.

10. In an aircraft having a control surface moved in accordance with a manual force applied by a pilot to control linkage, a hydraulic force-limiter comprising a cylinder, a piston reciprocable in the cylinder and connected at one end to the control linkage, a source of fluid pressure, a spool valve for porting fluid pressure to one side of the piston for applying a resistance force on said control linkage as a warning to the operator that the aircraft is being overstressed, means for adjusting the neutral position of the valve to permit a controlled leakage flow of the fluid to the piston, a spring on said one end of the piston for balancing the force on the piston from the pressure of said leakage flow, means for exhausting said leakage flow, a movable mass for actuating said valve when the aircraft is subjected to an excessive gravity force, a first spring connecting the movable mass to one end of the valve, a second spring for biasing the movable mass to a neutral position, a fluid passage connecting said one side of the piston to the opposite end of the valve whereby said valve can be moved by the pilot against the action of said first spring to a position to vent the fluid pressure on the piston by an additional force exerted on the piston through the control linkage to override the limiter for emergency operation.

References Cited in the file of this patent

UNITED STATES PATENTS

| | | |
|---|---|---|
| 2,638,289 | McKellar et al. | May 12, 1953 |
| 2,767,942 | Lucien | Oct. 23, 1956 |